(12) United States Patent
Ikehara

(10) Patent No.: US 7,934,527 B2
(45) Date of Patent: May 3, 2011

(54) PNEUMATIC RADIAL TIRE WITH SPIRAL BELT LAYER FOR TWO-WHEELED MOTOR VEHICLE

(75) Inventor: Kiyoshi Ikehara, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 1069 days.

(21) Appl. No.: 11/628,504

(22) PCT Filed: May 23, 2005

(86) PCT No.: PCT/JP2005/009329
§ 371 (c)(1),
(2), (4) Date: Feb. 27, 2007

(87) PCT Pub. No.: WO2005/120866
PCT Pub. Date: Dec. 22, 2005

(65) Prior Publication Data
US 2007/0251625 A1    Nov. 1, 2007

(30) Foreign Application Priority Data
Jun. 7, 2004   (JP) .................................. 2004-168652

(51) Int. Cl.
*B60C 9/22* (2006.01)
*B60C 9/20* (2006.01)
(52) U.S. Cl. .................. 152/527; 152/531; 152/533
(58) Field of Classification Search .............. 152/531, 152/533, 527
See application file for complete search history.

(56) References Cited

U.S. PATENT DOCUMENTS

| 7,213,627 | B2 * | 5/2007 | Matsunami |
| 2002/0050314 | A1 | 5/2002 | Nakamura |

FOREIGN PATENT DOCUMENTS

| EP | 1 284 318 A1 * | 2/2002 |
| EP | 1 284 318 A1 | 2/2003 |
| EP | 1 712 375 A1 | 10/2006 |
| JP | 07-41764 B2 | 5/1995 |
| JP | 2001-130218 A | 5/2001 |
| JP | 2002-19413 A | 1/2002 |
| JP | 2002-059707 A | 2/2002 |
| JP | 2004-067058 A | 3/2004 |
| WO | WO 2002/051652 A1 | 7/2002 |

* cited by examiner

*Primary Examiner* — Adrienne C Johnstone
(74) *Attorney, Agent, or Firm* — Sughrue Mion, PLLC

(57) ABSTRACT

Provided is a pneumatic radial tire including a carcass layer composed of a carcass ply 12 and a spiral belt layer 26 composed of steel cords wound spirally substantially in parallel with each other to a tire equator surface. When the ratio of spacing R1 between adjacent steel cords of the spiral belt layer 26 is shown by R1=(50−E×ds)/50, the ratio of spacing R1 is 0.45 or less as well as the total sectional area S of the steel cords applied per 50 mm width of the spiral belt layer is 7.5 mm$^2$ or less (E shows the number of steel cords applied per 50 mm width of the spiral belt layer, and ds shows the diameter (mm) of each steel cord). The number of steel cords E applied per 50 mm of width ranges from 66 to 200.

2 Claims, 1 Drawing Sheet

PNEUMATIC RADIAL TIRE WITH SPIRAL BELT LAYER FOR TWO-WHEELED MOTOR VEHICLE

TECHNICAL FIELD

The present invention relates to a pneumatic radial tire used to high performance motorcycle that is generally called a super sport type and carries out a cornering travel at high speed. More particularly, the present invention relates to a low aspect ratio pneumatic radial tire for high performance motorcycle that can improve a feeling of rigidity while keeping various performances such as durability to high speed, ride comfort, uniformity, a weight, a linear traveling stability, and the like and can enhance a turn steering stabilizing performance in high speed cornering.

BACKGROUND ART

A pneumatic tire for motorcycle has inherent advantages and disadvantages depending on whether the carcass of the tire has a bias structure or a radial structure. When the carcass has the radial structure, it is deemed that the tire has a problem in a linear traveling property at high speed. The liner traveling property is a resistance property and a converging property to lateral force that is inevitably input from a road surface in traveling, and a tire, which has a smaller degree of vibration caused by external disturbance and can recover the thus caused vibration more promptly, is more excellent in the liner traveling property. To overcome the problem inherent to the radial structure, the applicant has proposed in patent document 1 an pneumatic tire for motorcycle having a radial carcass structure that can exhibit an excellent liner traveling property, Further, the applicant has also proposed in patent document 2 a pneumatic radial tire for motorcycle which can improve a motion performance including turning force at corners, a limit of grip, recovery of overall vibration behaviors of a vehicle body, a slip control property, a road surface irregularity absorbing property, and steering stability and can be applied to a front wheel or a rear wheel by using spiral belts and angled belts together and making use of the advantageous characteristics of the respective belts.

Patent document 1: Japanese Examined Patent Application Publication No. 7-41764
Patent document 2: Japanese Unexamined Patent Application Publication No. 2004-67058

DISCLOSURES OF THE INVENTION

Problems to be Solved by the Invention

The problems of the radial carcass structure up to now have been almost overcome by in pneumatic tires for motorcycles proposed by the applicant in patent documents 1 and 2. On the other hand, however, a new problem arises in that when a vehicle changes its direction, it does not react to it promptly and thus lacks nimbleness. To cope with the deterioration of the feeling of rigidity, when the number of tire cords applied to a belt is increased to improve rigidity, weight is increased, and rigidity is also increased in a peripheral direction, and thus the performances such as ride comfort and a shock absorbing property are deteriorated.

Accordingly, an object of the present invention is to provide a pneumatic radial tire for motorcycle which improves a feeling of rigidity without sacrificing the various performances of the tire such as a linear traveling performance, a high speed performance, a weight, uniformity, and the like and enhances a turn steering performance in high speed cornering.

Means for Solving the Problems

To solve the above problem, in a pneumatic radial tire of the present invention including a tread portion, a pair of side wall portions disposed from both the edges of the tread portion on the inside in a tire radial direction, a bead portion continuous to the inside of the side wall portions in the tire radius direction, a carcass layer composed of at least one carcass ply composed of cords covered with rubber and having an angle of 60 to 90° to a tire equator surface for reinforcing the above respective portions between bead cores embedded in the bead portion, and at least one spiral belt layer composed of steel cords wound spirally substantially in parallel with the tire equator surface on the outside of the carcass layer in the tire radius direction, when the ratio of spacing R1 between adjacent steel cords of the spiral belt layer is shown by the following expression, $$R1=(50-E \times ds)/50,$$

the ratio of spacing R1 is set to 0.45 or less as well as the total sectional area S of the steel cords applied per 50 mm width of the spiral belt layer is set to 7.5 mm² or less (in the expression, E shows the number of steel cords applied per 50 mm width of the spiral belt layer, and ds shows the diameter (mm) of the circumscribed circle of each steel cord).

In another pneumatic radial tire for motorcycle of the present invention including comprising a tread portion, a pair of side wall portions disposed from both the edges of the tread portion on the inside in a tire radial direction, a bead portion continuous to the inside of the side wall portions in the tire radius direction, a carcass layer composed of at least one carcass ply composed of cords covered with rubber and having an angle of 60 to 90° to a tire equator surface for reinforcing the above respective portions between bead cores embedded in the bead portion, and at least one spiral belt layer composed of steel cords wound spirally substantially in parallel with the tire equator surface on the outside of the carcass layer in the tire radius direction, the spiral belt layer is composed of organic fiber cords wound spirally between the steel cords, and when the ratio of spacing R2 between adjacent steel cords and an organic fiber cord of the spiral belt layer is shown by the following expression $$R2=(50-ds \times Es-df \times Ef)/50$$

the ratio of spacing R2 is set to 0.45 or less as well as the total sectional area S of the steel cords applied per 50 mm width of the spiral belt layer is set to 7.5 mm² or less (in the expression, Es shows the number of steel cords applied per 50 mm width of the spiral belt layer, Ef shows the number of organic fiber cords applied per 50 mm width of the spiral belt layer, ds shows the diameter (mm) of the circumscribed circle of each steel cord, and df shows the diameter (mm) of the circumscribed circle of each organic fiber cord).

In the belt structure of the spiral belt layer, since the cords of the layer face an approximate tire equator direction, the rigidity of the cords to elongation is large in a tire peripheral direction. However, the shear rigidity of them is small in a direction where the cords are disposed in parallel with each other. The inventors have found that when a bicycle changes its direction, a body is tilted so that a camber angle is applied to a tire. At the time, although the spiral belt layer of the tire is subjected to the shear deformation, when the shear rigidity is small, a rider cannot get definite reaction in a feeling in turning and thus a feeling of nimbleness is lost.

As to this point, when the amount of the steel cords is increased by increasing the number of them to be applied in order to increase the shear rigidity, a weight is increased and rigidity is made excessively high in a peripheral direction, and thus ride comfort and a shock absorbing performance are deteriorated. As a result of diligent study for increasing the shear rigidity without changing weight and rigidity in a peripheral direction, the inventors have completed the present invention by finding that the shear rigidity can be increased, a feeling of rigidity can be improved without sacrificing the various performances of a tire, and a turn steering performance can be enhanced in high speed cornering by reducing the number of strands constituting cords, reducing the spacings between cords by applying many cords composed of the strands having a reduced diameter, and setting the value prescribed by the rate of spacing R1 within the above range. Further, it has been also found that even if the organic fiber cords are wound between steel cords, the same effect can be obtained by setting the value prescribed by the rate of spacing R2 within the above range.

Advantages

According to the present invention, a feeling of rigidity can be improved without sacrificing the various performances of a tire such as a linear traveling performance, a high speed performance, ride comfort, a weight, uniformity, and the like, and a turn steering performance can be enhanced in high speed cornering.

REFERENCE NUMERALS

| 10 | pneumatic radial tire for motorcycle |
| --- | --- |
| 12 | carcass ply |
| 14 | bead core |
| 16 | bead filler |
| 18 | crown portion |
| 22 | tread |
| 24 | side wall |
| 26 | spiral belt layer |
| 26a | steel cord |
| 26b | organic fiber cord |

BEST MODE FOR CARRYING OUT THE INVENTION

A pneumatic radial tire according to an embodiment of the present invention will be explained based on figures.

Figure 1:
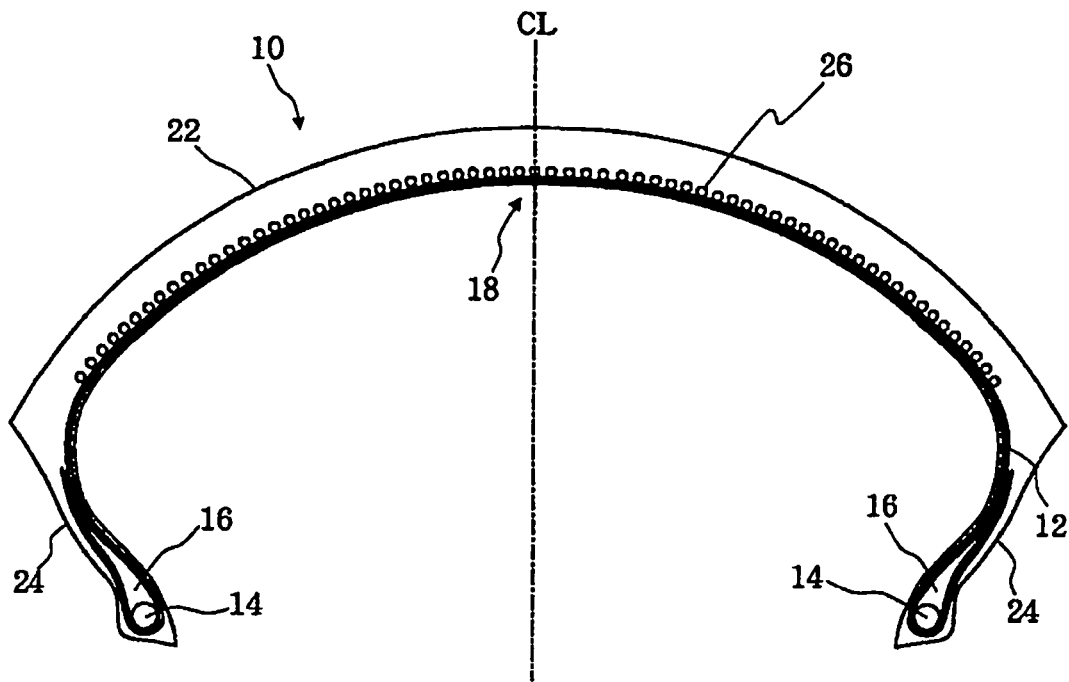
FIG. 1 is a sectional view of a pneumatic tire for motorcycle according to an embodiment of the present invention.

FIG. 1 shows the pneumatic radial tire 10 for motorcycle according to the embodiment of the present invention. A carcass ply 12 for constituting a structure of the pneumatic radial tire 10 is compose of organic fiber cords of nylon, polyester, and the like disposed in parallel with each other and coated with rubber. These cords are disposed in directions where they intersect with each other at an angle of 60 to 90° with respect to the equator surface CL of the pneumatic radial tire 10. Note that, in the illustrated example, the carcass ply 12 has two layers, and the cords of each layer intersect with each other and further tilt in a direction opposite to each other with respect to the equator surface CL of the tire.

A pair of bead cores 14, each of which is composed of steel wires wound in a ring shape and bundled, are disposed in the vicinities of both the ends of the carcass ply 12. The carcass ply 12 is wound around the pair of bead cores 14 at both the ends of it across them in a toroid state and locked to them. Further, bead flies 16, which are composed of hard rubber and formed in a forwardly-slender shape, are embedded, respectively in the spacings between the layers of the carcass ply 12 on the bead cores 14.

A tread 22 formed of a rubber material in a circular ring shape is disposed to a crown portion 18 of the pneumatic radial tire 10 so as to come into contact with a road surface, and a tread pattern (not shown) is appropriately formed to the tread 22. Further, side walls 24 are disposed on the carcass ply 12 in the portion of it where the bead cores 14 are connected to both the ends of the tread 22.

In the pneumatic radial tire 10 for motorcycle having the structure described above of the present invention, a spiral belt layer 26, which will be explained below in detail, is disposed between the carcass ply 12 and the tread portion 22.

The spiral belt layer 26 is composed of a band-shaped member having a single steel cord of or plural steel cords disposed in parallel with each other and embedded in covering rubber, and the band-shaped member is wound spirally in a tire rotating axis direction at an angle facing an approximately tire equator direction so that the steel cords are disposed in parallel with each other in a wire width direction along the arc of the carcass layer.

In the present invention, when the ratio of spacing R1 between adjacent steel cords of the spiral belt layer 26 is shown by the following expression, $$R1=(50-E\times ds)/50$$

the ratio of spacing R1 is set to 0.45 or less and preferably to 0.30 or less as well as the total sectional area S of the steel cords applied per 50 mm width of the spiral belt layer is set to 7.5 mm$^2$ or less and preferably to 5.5 to 7.0 mm$^2$ (in the expression, E shows the number of steel cords applied per 50 mm width of the spiral belt layer, and ds shows the diameter (mm) of the circumscribed circle of each steel cord). A desired object of the present invention can be achieved by arranging the spiral belt layer 26 as described above.

Figure 2:
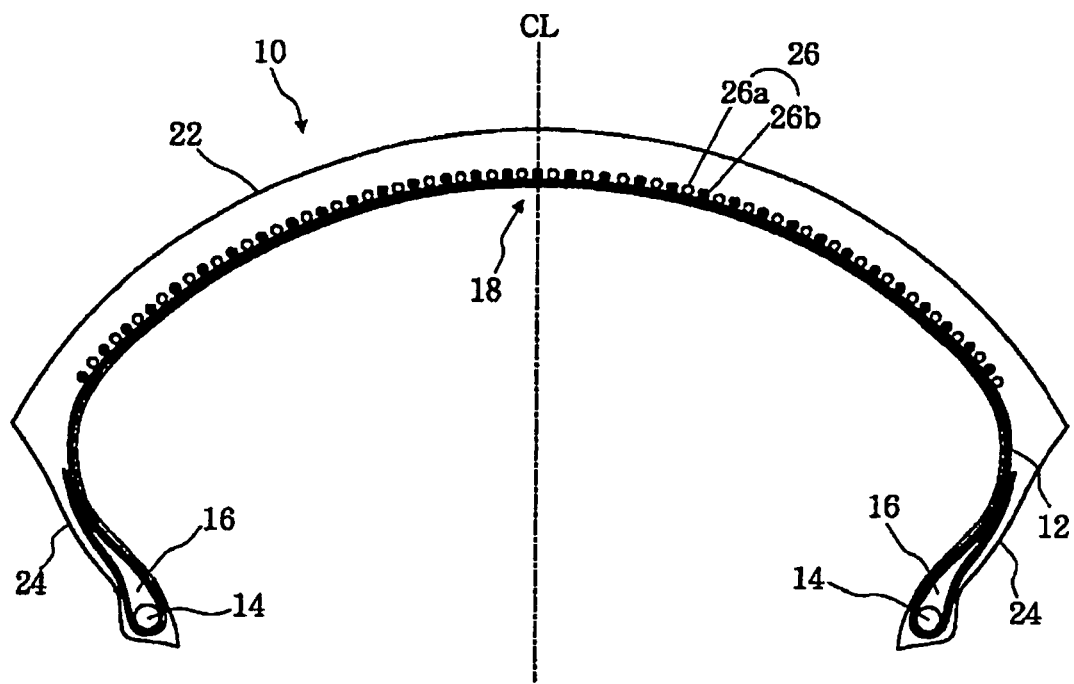
FIG. 2 is a sectional view of a pneumatic tire for motorcycle according to another embodiment of the present invention.

Further, in a pneumatic radial tire 10 for motorcycle of another embodiment of the present invention shown in FIG. 2 (reference numerals in FIG. 2 correspond to the reference numerals at the same portions in FIG. 1), a spiral belt layer 26 is composed of organic fiber cords 26b each spirally wound between adjacent steel cords 26a. In the above arrangement, when the ratio of spacing R2 between adjacent steel cords 26a and an organic fiber cord 26b of the spiral belt layer 26 is shown by the following expression, $$R2=(50-ds\times Es-df\times Ef)/50$$

the ratio of spacing R2 is set to 0.45 or less and preferably to 0.15 to 0.35 as well as the total sectional area S of the steel cords 26a applied per 50 mm width of the spiral belt layer 26 is set to 7.5 mm$^2$ or less and preferably to 4.5 to 6.5 mm$^2$ (in the expression, Es shows the number of steel cords applied per 50 mm width of the spiral belt layer, Ef shows the number of organic fiber cords applied per 50 mm width of the spiral belt layer, ds shows the diameter (mm) of the circumscribed circle of each steel cord, and df shows the diameter (mm) of the circumscribed circle of each organic fiber cord). A desired object of the present invention can be achieved by arranging the spiral belt layer 26 as described above.

Although exemplified as the cord, which is applicable to the spiral belt layer 26 and composed of steel fiber, is, for example, a steel cord ordinarily used to reinforce a tire, a belt member, and the like, the cord is not particularly limited. However, to obtain particularly high tensile strength, a steel fiber cord containing at least 0.7 wt % and preferably at least 0.8 wt % of carbon is preferable.

Further, exemplified as the cord, which is applicable to the spiral belt layer 26 of the tire shown in FIG. 2 and composed of organic fibers, is an organic fiber cord widely used to reinforce a tire member, for example, polyamide fibers, polyester fibers, aramid fibers, rayon fibers, and the like. Among them, a cord composed of aromatic polyamide fibers (for example, Kevlar (commodity name) made by duPont), polyethylene-2,6-naphthalate, and high elastic modulus polyester fibers is preferable because it has a high tensile elastic modulus.

The pneumatic radial tire for motorcycle of the present invention can be preferably used by setting an aspect ratio to 70 when it is used as, for example, a front tire and to 55 to 50 when it is used as a rear tire.

EXAMPLES

The present invention will be explained below based on examples and comparative examples.

Pneumatic radial tires for motorcycle (size: 190/50ZR17) having the respective spiral belt structures shown in Table 1 were manufactured. At the time, a spiral belt layer was arranged such that a belt-shaped member, in which two cords were embedded in covering rubber in parallel with each other, was wound spirally in a tire rotating axis direction at an angle facing an approximately tire equator direction on the outside of the crown portion of a carcass layer in a tire diameter direction so that the cords are disposed in parallel with each other in a wire width direction along the arc of the carcass. The spiral belt structures of the comparative examples 1 and 2 and the examples 1 to 4 shown below in Table 1 correspond to FIG. 1, and the spiral belt structures of the examples 5 and 6 correspond to FIG. 2.

The following steering performance tests were carried out to confirm the effect of improvement of the performances of the pneumatic radial tires for motorcycle of the thus manufactured examples and comparative examples.

Steering Performance Test

Test tires, which were attached to a rim having a rim size of MT 6.00×17 and had a pneumatic pressure of 250 kPa, were mounted on a sport type 1000 cc motorcycle. The motorcycle was caused to actually travel on a test course, and nimbleness, a braking property (gripping property), a shock absorbing property, and the like in linear traveling and turn traveling were evaluated by a 10-point method based on the feeling of a test driver. An obtained result is also shown in Table 1.

TABLE 1

| | | COMPARATIVE EXAMPLE 1 | COMPARATIVE EXAMPLE 2 | EXAMPLE 1 | EXAMPLE 2 | EXAMPLE 3 | EXAMPLE 4 | EXAMPLE 5 | EXAMPLE 6 |
|---|---|---|---|---|---|---|---|---|---|
| SPIRAL BELT LAYER | MATERIAL OF CORD | KEVLAR | STEEL | STEEL | STEEL | STEEL | STEEL | STEEL + KEVLAR | STEEL + KEVLAR |
| | TWISTED STRUCTURE OF CORD | 1670detx × 2 | 1 × 5 × 0.21 | 1 × 3 × 0.21 | 1 × 2 × 0.21 | 1 × 2 × 0.21 | 1 × 1 × 0.21 | 1 × 5 × 0.21 + 1670dtex × 2 | 1 × 5 × 0.21 + 1670dtex × 2 |
| | SECTIONAL AREA OF CORD[1)] | — | OPEN | OPEN | OPEN | CLOSE | CLOSE | OPEN + KEVLAR | OPEN + KEVLAR |
| | DIAMETER OF CORD (mm) | 0.7 | 0.61 | 0.61 | 0.61 | 0.42 | 0.21 | 061 + 0.7 | 061 + 0.7 |
| | APPLIED NUMBER E (PIECES) | 60 | 40 | 66 | 100 | 100 | 200 | 30 + 30 | 36 + 18 |
| | RATIO OF SPACING | 0.16 | 0.51 | 0.19 | −0.22 | 0.16 | 0.16 | 0.21 | 0.31 |
| | SECTIONAL AREA OF STEEL CORD S/50 mm (mm$^2$) | — | 6.90 | 6.90 | 6.90 | 6.92 | 6.90 | 5.20 | 5.20 |
| STEERING PERFORMANCE TEST | FEELING BALANCE OF ACTUAL VEHICLE (8 OR MORE POINTS ARE SHOWN BY ○ AND OTHER POINTS BY x) | x | x | ○ | ○ | ○ | ○ | ○ | ○ |
| | NIMBLENESS | 10 | 6 | 8 | 9 | 9 | 9 | 9 | 10 |
| | GRIPPING PROPERTY | 8 | 8 | 10 | 9 | 9 | 9 | 9 | 9 |
| | SHOCK ABSORBING PROPERTY | 5 | 10 | 9 | 8 | 8 | 8 | 8 | 8 |

1) "Open" means a state that cords are twisted loosely with spacing between cords, and "close" means a state that cords are twisted closely in contact with each other. "Kevlar" means the cross section of Kevlar fibers themselves.

As apparent from the result of test of the steering performance of Table 1, the pneumatic radial tires for motorcycle of the examples 1 to 6 can obtain an excellent steering performance as compared with the tires of the comparative examples 1 and 2.

The invention claimed is:

1. A pneumatic radial tire for motorcycle comprising a tread portion, a pair of side wall portions disposed from both the edges of the tread portion on the inside in a tire radial direction, a bead portion continuous to the inside of the side wall portions in the tire radius direction, a carcass layer composed of at least one carcass ply composed of cords covered with rubber and having an angle of 60 to 90° to a tire equator surface for reinforcing the above respective portions between bead cores embedded in the bead portion, and at least one spiral belt layer composed of steel cords wound spirally substantially in parallel with the tire equator surface on the outside of the carcass layer in the tire radius direction, wherein when the ratio of spacing R1 between adjacent steel cords of the spiral belt layer is shown by the following expression, $R1 = (50 - E \times ds)/50,$ the ratio of spacing R1 is 0.45 or less as well as the total sectional area S of the steel cords applied per 50 mm width of the spiral belt layer is 7.5 mm² or less, wherein in the expression, E shows the number of steel cords applied per 50 mm width of the spiral belt layer, and ds shows the diameter in mm of the circumscribed circle of each steel cord, wherein E ranges from 66 to 200 cords.

2. A pneumatic radial tire for motorcycle comprising a tread portion, a pair of side wall portions disposed from both the edges of the tread portion on the inside in a tire radial direction, a bead portion continuous to the inside of the side wall portions in the tire radius direction, a carcass layer composed of at least one carcass ply composed of cords covered with rubber and having an angle of 60 to 90° to a tire equator surface for reinforcing the above respective portions between bead cores embedded in the bead portion, and at least one spiral belt layer composed of steel cords wound spirally substantially in parallel with the tire equator surface on the outside of the carcass layer in the tire radius direction, wherein when the ratio of spacing R1 between adjacent steel cords of the spiral belt layer is shown by the following expression, $R1 = (50 - E \times ds)/50,$ the ratio of spacing R1 is 0.31 or less and the total sectional area S of the steel cords applied per 50 mm width of the spiral belt layer is 6.92 mm² or less, wherein in the expression, E shows the number of steel cords applied per 50 mm width of the spiral belt layer, ds shows the diameter in mm of the circumscribed circle of each steel cord, wherein E ranges from 66 to 200 cords.

* * * * *